Patented July 2, 1940

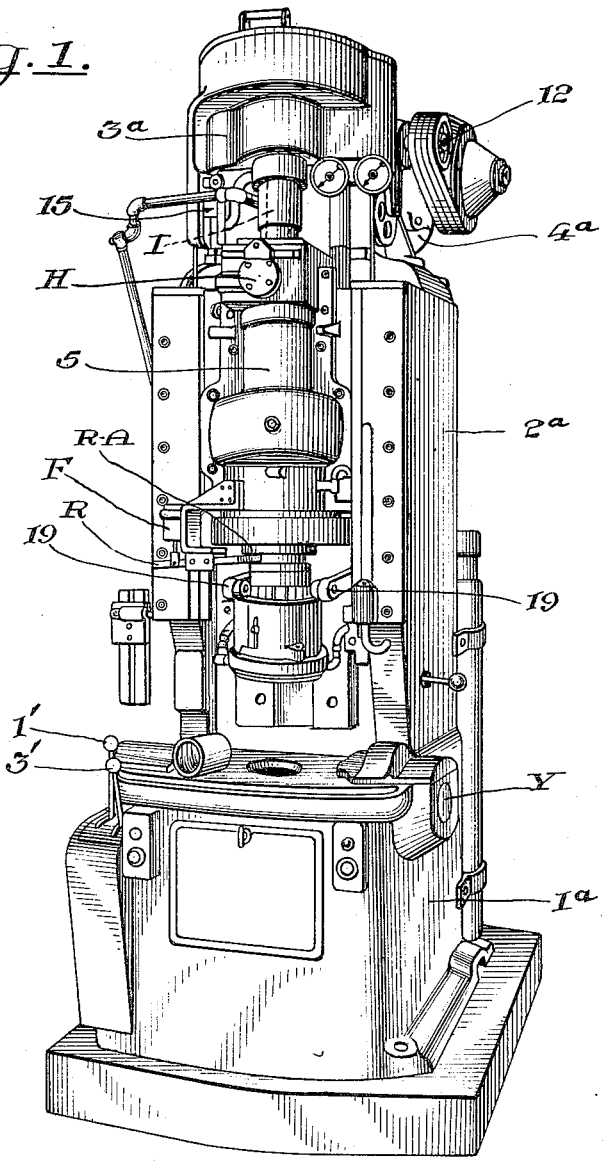

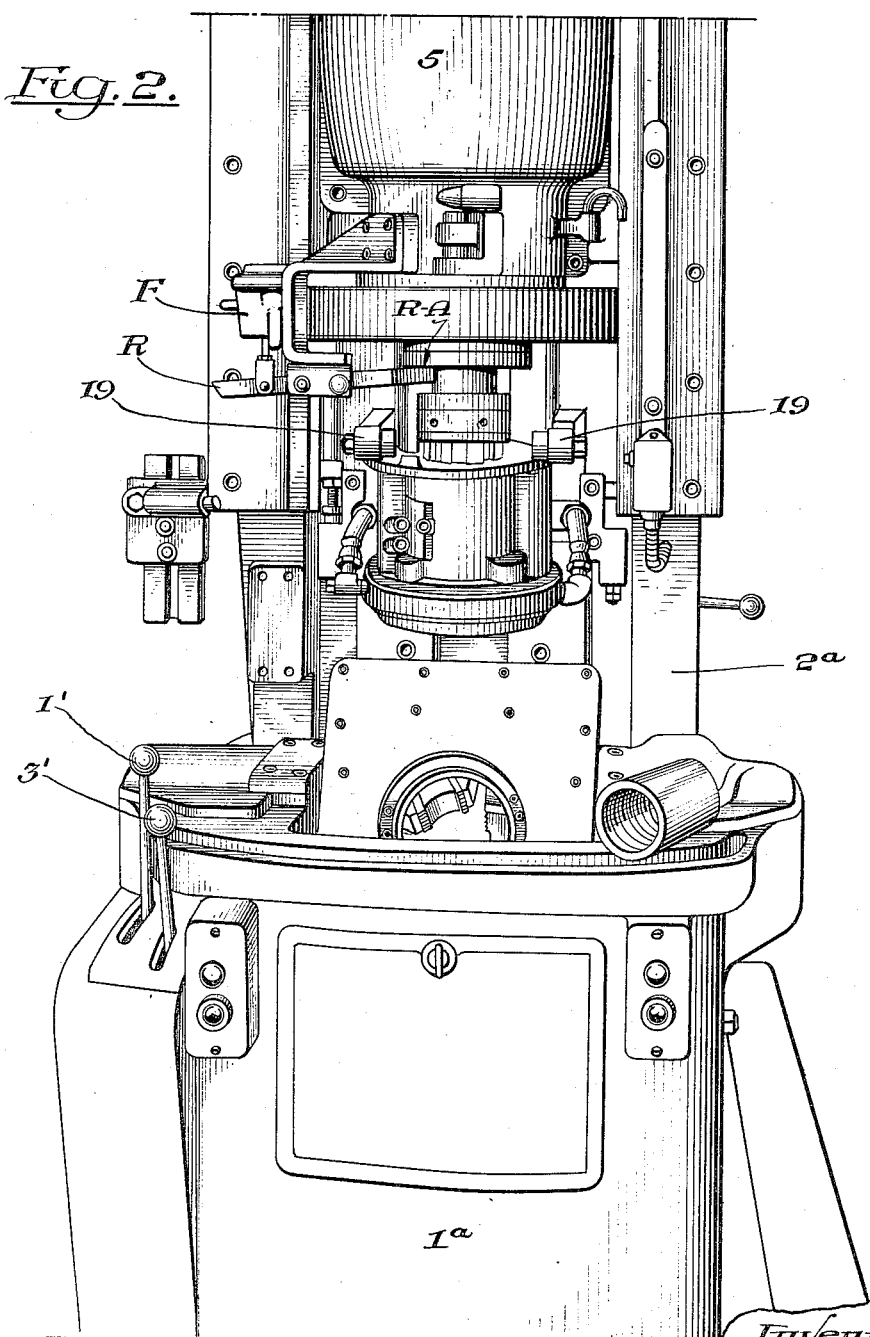

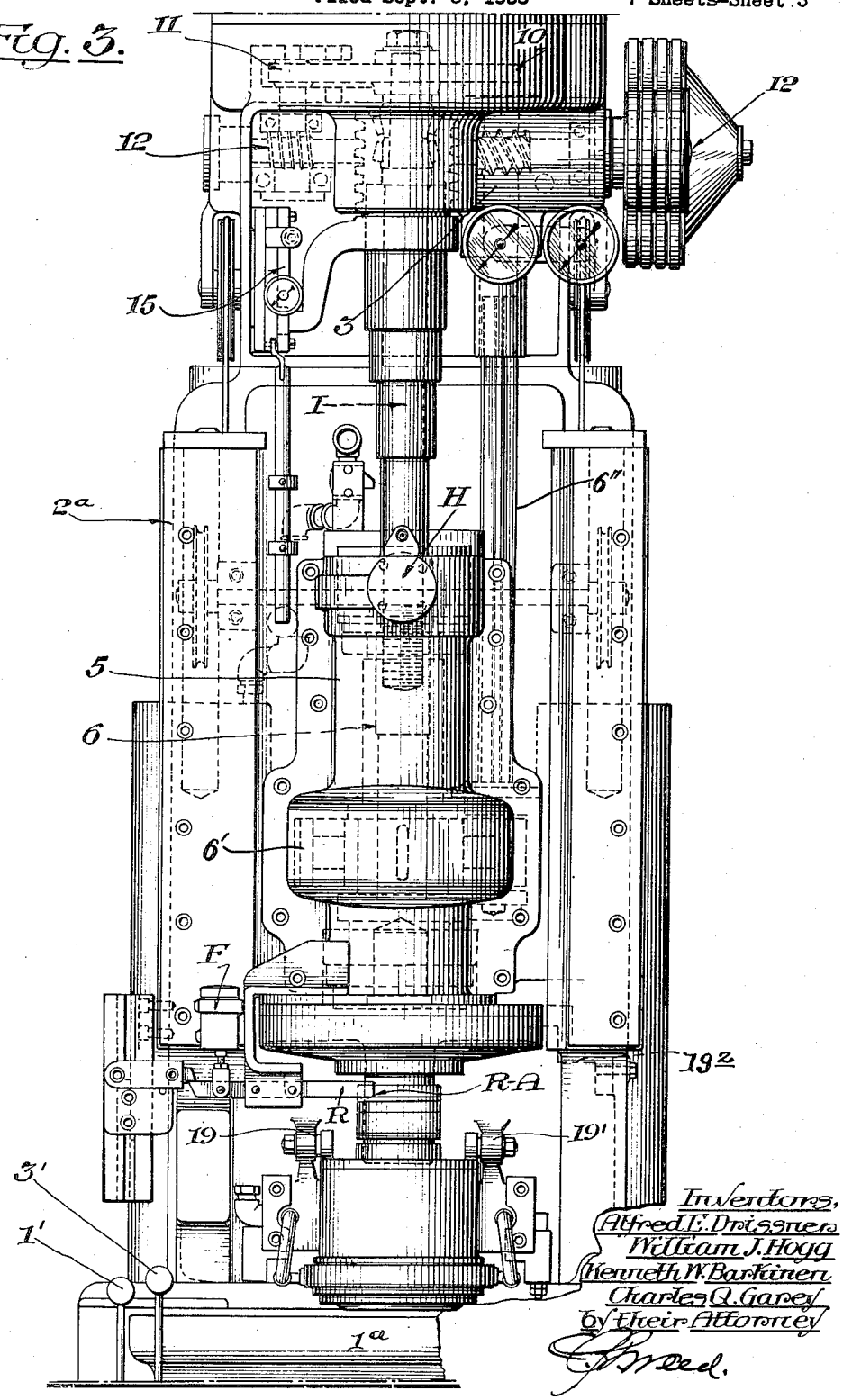

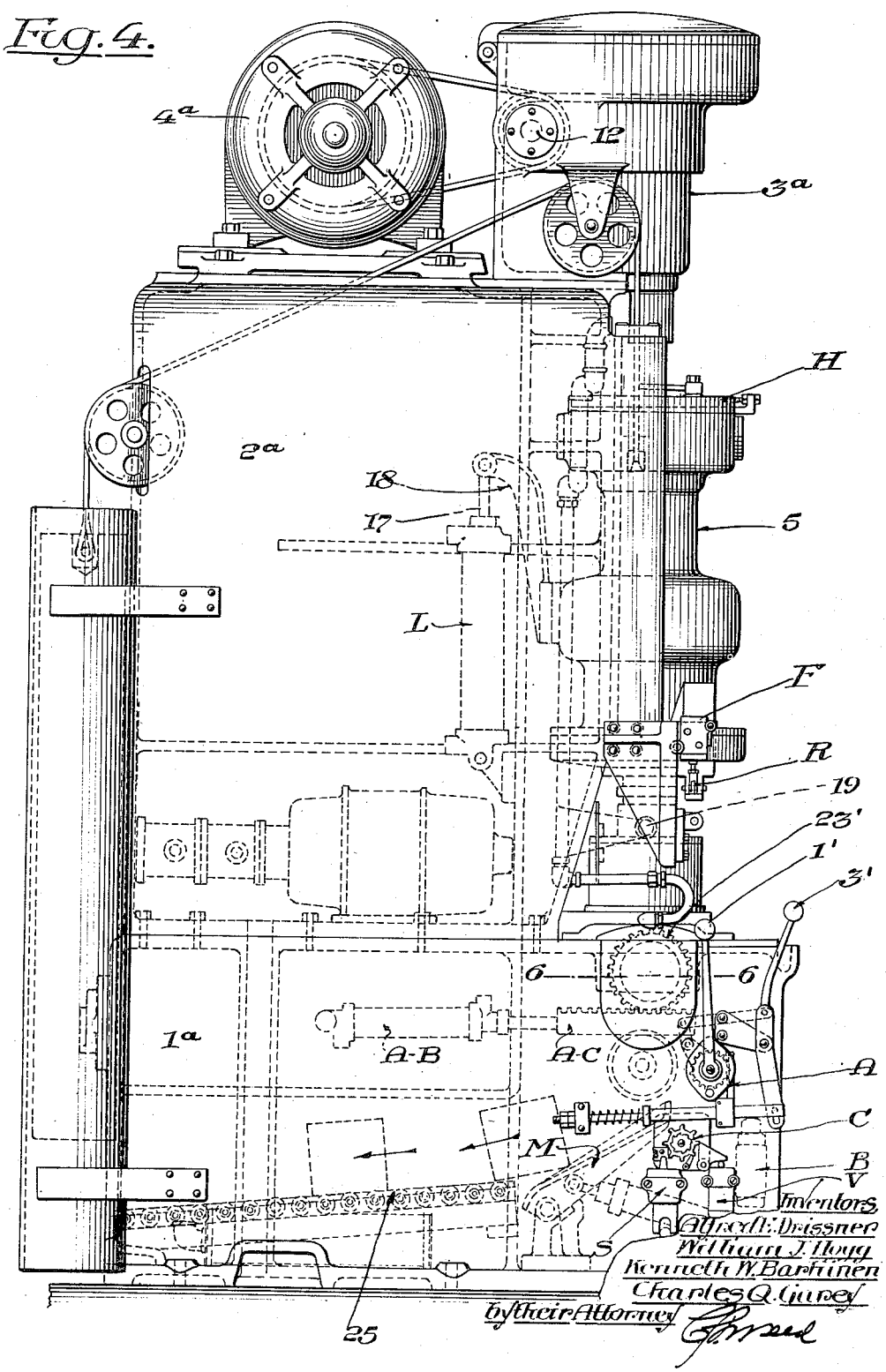

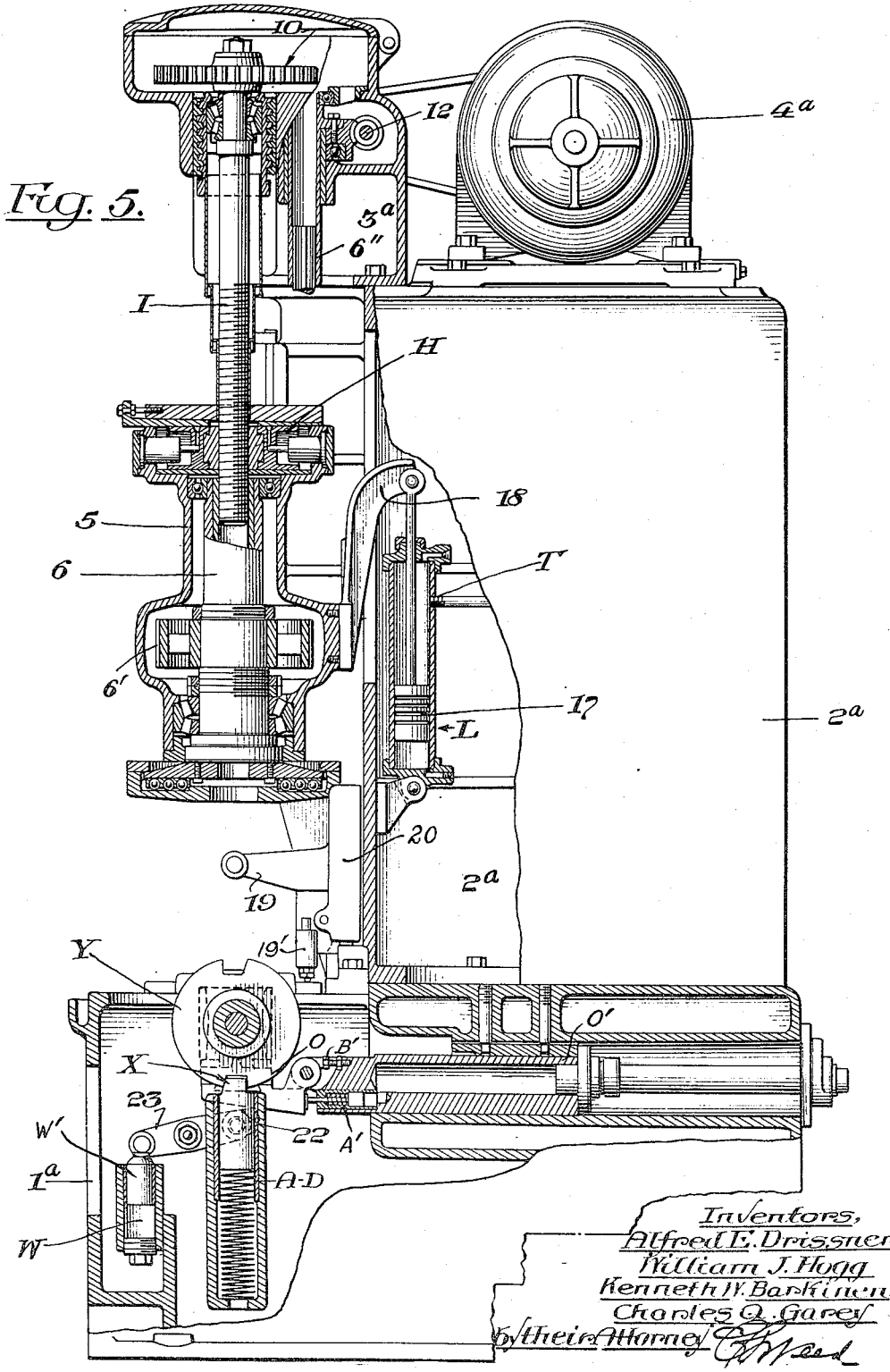

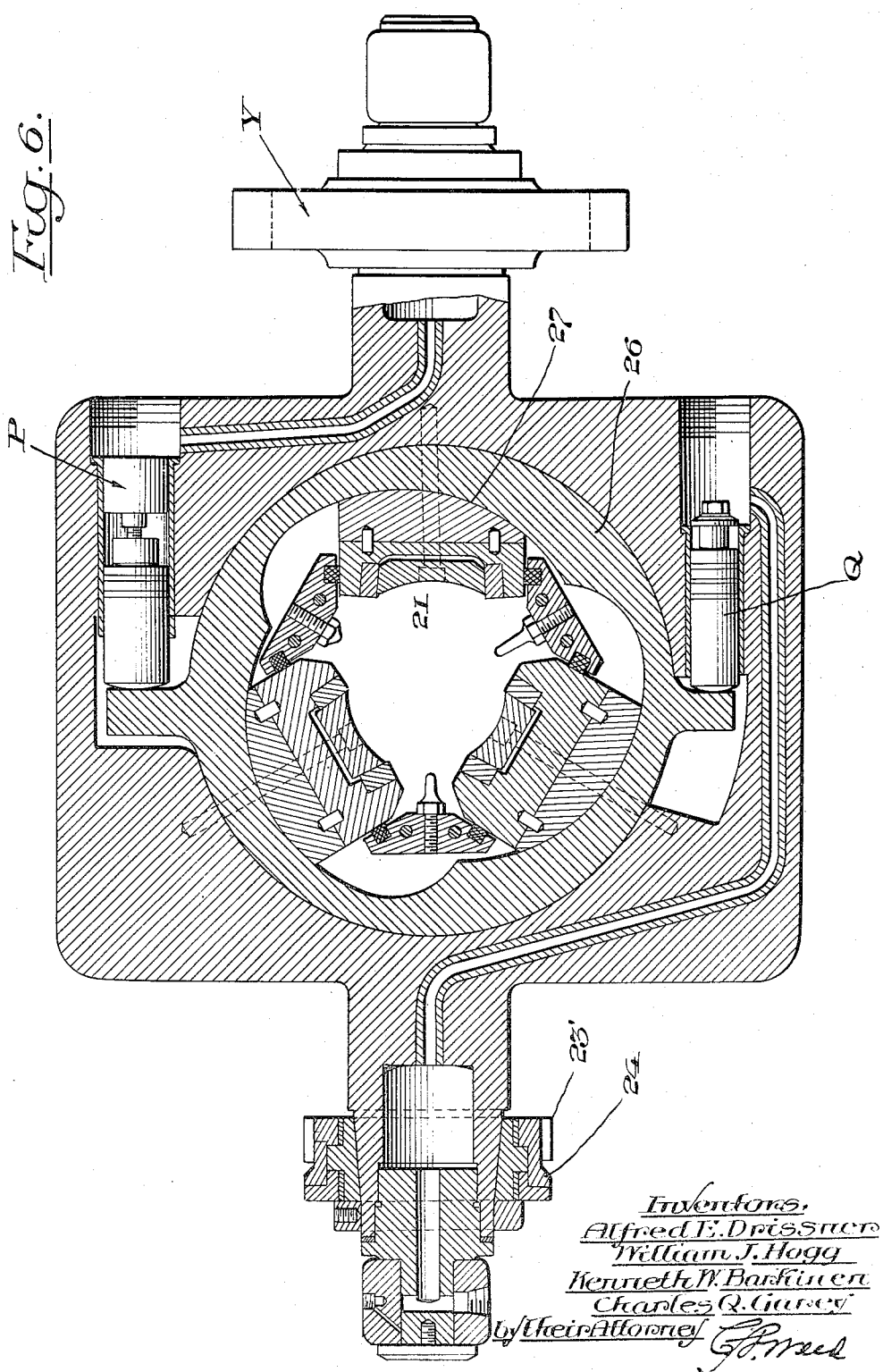

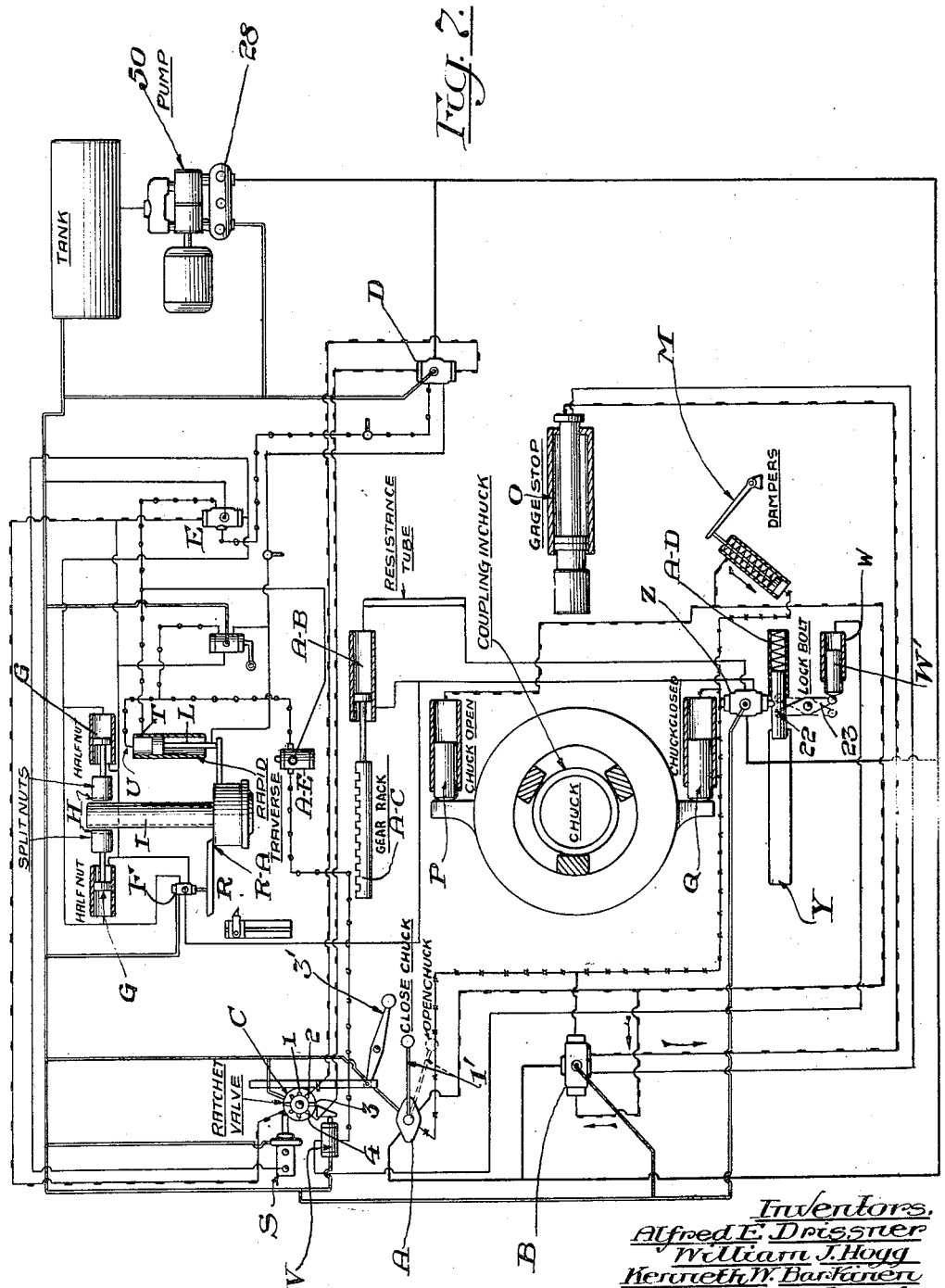

2,206,031

UNITED STATES PATENT OFFICE 2,206,031

PIPE COUPLING TAPPING MACHINE

Alfred E. Drissner, William J. Hogg, Kenneth W. Barkinen, and Charles Q. Garey, Cleveland, Ohio, assignors to The National Acme Company, Cleveland, Ohio, a corporation of Ohio Application September 3, 1938, Serial No. 228,318

51 Claims. (Cl. 10—129)

This invention relates to tapping machines adapted especially for the tapping of pipe couplings or sleeves and similar articles, the object of the invention being to provide an improved fluid operated automatic machine of this class in which, after one end of the coupling has been tapped, it will be automatically indexed and reversed to permit the other end to be tapped without the necessity of opening the chuck holding the coupling and which is accomplished by a simple rotation or indexing of the chuck without any sliding movement of the chuck to clear the tap, thus maintaining the coupling in positive position and perfect alignment with the tap spindle at all times, and which machine is compact and simple in its construction and operation and will operate with a high degree of efficiency to provide couplings with very accurate threads both as to the shape of the thread and diameter and lead thereof.

A further object of the invention is the provision of an improved tapping machine in which the tap or spindle is operated by fluid means such as hydraulic means to accomplish rapid traveling of the tap spindle to the work and is then controlled by an adjustable lead screw during the tapping of the work whereby the idle time of the machine is reduced to a minimum and thus greater production obtained.

A further object of the invention is the provision of improved chucking mechanism in which the chuck will be automatically indexed and reversed.

A further object of the invention is the provision of a fluid operated indexible chuck mechanism whereby the chuck may be automatically rotated to tap both ends of the work without removing the work from or reversing it in the chuck.

A further object of the invention is the provision of an improved tapping machine having an indexible chucking mechanism and locking means therefor which controls the movement of the tapping spindle at a predetermined time in the operation of the machine.

A further object of the invention is the provision of an improved tapping machine in which automatically operated stopping means is provided for accurately gauging the position of the coupling in the chuck.

A further object of the invention is the provision of an improved automatic tapping machine, fluid operated but lever controlled, whereby the operator on the mere shifting of a lever controls the opening and closing of the chuck and the locking thereof and, on the opening of such chuck after the tapping of the coupling is completed, the positioning of a chute to receive and convey the tapped coupling away from the machine, and also controls on the initial opening of the chuck the positioning of a stop or gauge for the coupling, and on the shifting of another lever controls the automatic operation of the tapping spindle through a series of fast and slow movements and the indexing of the chuck, and which levers are so interlocked that when the chuck controlling lever is in operation, the operation of the tap controlling lever is impossible, and vice versa.

Machines at present on the market have been considered satisfactory so long as they were used to produce commercial couplings but under the present A.P.I. specifications and the close limits which have to be maintained in view of the high pressure required in the oil fields, it is necessary to produce couplings with extremely accurate threads and for different tapers of threads from $\frac{3}{8}''$ up to $\frac{3}{4}''$ taper, and there has been great difficulty in accomplishing these results, particularly to accomplish them with a smooth running action without backlash or vibration to the tap spindle.

Among the advantages of this improved machine is that rapid movements of the tapping spindle are obtained by fluid operated means so that the idle time of the machine is reduced practically to a minimum while tapping of the work is accomplished by an accurate lead screw coupled to the tap spindle by positively operated fluid controlled means. The work is clamped by a fluid operated indexible chuck having interchangeable gripping shoes for different sizes of couplings as well as wall thicknesses of couplings, the chuck being so mounted that it is automatically indexed and locked positively to insure alignment with the tap spindle, whereby one end of the coupling may be tapped, then indexed and the other end tapped without opening the chuck, thus also insuring alignment of the two ends of the tapped coupling, all of which is accomplished by a simple automatic rotation of the chuck. As a result, through the quick fluid controlled movements, increased production is obtained as well as greater accuracy and better alignment of the threads.

In the drawings accompanying and forming a part of this specification, Fig. 1 is a front perspective view of this improved machine.

Fig. 2 is a front perspective enlarged view of the lower part of this machine with the coupling holding chuck partly rotated or indexed.

Fig. 3 is a detail front elevation of this improved tapping machine.

Fig. 4 is a side elevation of Fig. 3.

Fig. 5 is a view similar to Fig. 3 taken from the opposite side of the machine but showing a large part of the mechanism in section.

Fig. 6 is a cross sectional view taken on line 6—6 of Fig. 4, illustrating the chuck mechanism for clamping the coupling, and Fig. 7 is a diagrammatic view of the hydraulic mechanism, valves, etc., controlling the operation of the several parts of the machine.

Similar characters of reference indicate corresponding parts in the several views.

Before explaining in detail the present improvement and mode of operation thereof, we desire to have it understood that the invention is not limited to the details of construction and arrangement of parts illustrated in the accompanying drawings since the invention is capable of other embodiments, and that the phraseology employed is for the purpose of description and not of limitation.

As a preface to a description of the construction of this machine and for the purpose of facilitating an understanding thereof, the clamping chuck for holding a coupling blank is opened and closed by fluid such as hydraulic means. After it is opened to receive a coupling and then closed, the tap spindle is rapidly shifted by fluid such as hydraulic means into position to bring its tap into juxtaposition to the coupling, at which time the rapidly shifting hydraulic means ceases its operation and the tap is fed into the coupling by a lead screw rotated by a suitable motor and for which purpose, a split nut mechanism is brought into engagement with the lead screw by fluid, such as hydraulic means, whereupon the tap will be fed to tap the thread. After one end of the coupling is tapped, the tap collapses and the split nut is hydraulically released from the lead screw, whereupon the tap may be quickly withdrawn from the coupling by the rapidly shifting hydraulic means. The chuck is then automatically indexed and reversed 180 degrees by fluid such as hydraulic means to bring the opposite end of the coupling into position to be tapped, locking means being provided to lock the reversible chuck in position after each indexing of the coupling chuck. The tap is then again quickly brought into position and the lead screw coupled to its spindle and the opposite end of the coupling threaded. After the completion of the threading of the coupling, the tap is again collapsed, the split nut hydraulically released from the lead screw and by hydraulic means the tap spindle is rapidly shifted away from the chuck, whereupon the chuck is hydraulically opened to permit the threaded coupling to drop on to a conveyor and be carried away from the chuck. Thereupon, a new coupling is placed in position in the chuck and the foregoing operations repeated, all of these operations being under the control of the operator by the manipulation of certain levers hereinafter referred to.

These levers are shown herein as two in number and so interlocked that the operation of one prevents the operation of the other. In starting the machine, the operation of one of the levers automatically opens the chuck to receive a coupling to be tapped; brings into position a stop or gauge for positioning the coupling and closes the chuck on to the coupling and when the coupling has been completely tapped, also brings into position a chute for receiving the coupling released from the chuck when it is opened to convey it away from the machine.

When the chuck has been completely closed on its coupling, this releases the second lever whereupon, upon the operation thereof by the operator, the tap spindle is rapidly shifted downward until it nearly reaches the work. The lead screw is then engaged and thereafter the tap is operated by the lead screw to tape one end of the coupling.

When the tap has completed its work on one end of the coupling, it collapses, the lead screw is released and the tap is rapidly moved upward, the chuck automatically indexed and reversed to bring the opposite end of the coupling into position to be tapped, the tap spindle again rapidly shifted downward, the lead screw again engaged to tap the opposite end of the coupling and when the second tapping operation is completed, the lead screw is released as aforesaid and the tap rapidly moved upward and stopped whereupon, upon operation of the first lever, the chuck is opened to release the tapped coupling to be conveyed away from the machine.

During the operation, the indexible chuck is locked by a bolt mechanism which, in the present machine or preferred form thereof, operates to control the second downward movement of the tap spindle so that, until the indexible chuck is locked, the tap spindle cannot move downward to tap the coupling.

The machine as illustrated herein in its preferred form comprises a base 1ᵃ to which is bolted a column 2ᵃ carrying at its upper end a motor carrying base and gear box 3ᵃ carrying a motor 4ᵃ. On the column 2ᵃ is mounted a counterbalanced sliding head or housing 5 which is reciprocated or shifted up and down, at one time by hydraulic means and at another time shifted by a lead screw to tap the work. This head has hardened adjustable liners to insure long life, greater accuracy and easy adjustment to centralize the tap spindle with the work and the chuck holding means. The sliding head 5 carries a rotating spindle 6 which is rotated by a driving gear 6' connected through a splined shaft 6'' (see Fig. 3) which is driven from the gear box 3a and is fed by the lead screw I which, in turn, is rotated by an interchangeable gear 10, idler gear 11 and worm shaft mechanism 12.

The tap is mounted in the spindle with a float therebetween to allow the tap to adjust itself to the bore of the coupling. Various forms of tap mechanism may be used in this machine such as that of William J. Hogg shown and described in his application filed May 22, 1937, Serial Number 144,226, and, therefore, a further description thereof herein is unnecessary.

Carried by the head 5 of the rotatable tap spindle is a hydraulically operated split nut mechanism H for clamping the lead screw at predetermined times and thereby feeding the tap spindle and its tap by means of this lead screw.

The lead screw is provided with a compensator mechanism 15 shown and described in the contemporaneously pending application of Alfred E. Drissner, Serial Number 192,017, filed February 23, 1938, and, therefore a detailed description herein is unnecessary.

Connected with the tap spindle head 5 for rapidly reciprocating the same at predetermined times is a hydraulic means shown as valve controlled piston mechanism L, the piston 17 of which is connected by an arm 18 with the head (see Fig. 5) and by means of which the tap is brought quickly into position adjacent to the work and to be thereafter rotated by the lead screw to tap the thread.

Sliding vertically on the column at the rear of the head is a tap resetting slide 20, the roller carrying arms 19 of which project forward and straddle the tap die, Fig. 3. This slide 20, see Fig. 5, is provided with spring bumper plungers 19' which, as the slide 20 moves upward, strike against stops 19² secured to the machine frame, whereupon the rollers of the arms 19 contact and hold the outer shell of the tap from further upward movement so that, as the tap core is moved upward, it is reset with relation to its outer stopped shell.

The split nut mechanism H (see Fig. 5) for engaging the lead screw comprises two half nuts positively operated and controlled hydraulically for engaging and disengaging the lead screw and a link action is provided between the nuts so that they will operate uniformly and engage the lead screw at the same time under the same pressure.

As soon as the rapidly shifting hydraulic means L brings the tap within reach of the work, losing the least possible time, the rapid traveller is automatically disengaged by the adjustable trip lever R which is controlled by an adjustable trip so that the nut H will engage the lead screw, and the valve F is operated (see diagrammatic view Fig. 7) which directs pressure to the piston G, thereby engaging the nut H on the lead screw I, whereupon the tap is caused to travel into the coupling by the lead screw to cut the required length of thread.

The same oil pressure that closes the nut on to the lead screw operates the valve E to disconnect the pressure supplied to the rapid travelling piston mechanism L and thus allows its piston to have free movement while the split nut is in engagement with the lead screw and at the same time keep the piston supplied with oil under low pressure.

The chuck 21 (see Fig. 6) for clamping the work is mounted on two end bearings in the base of the machine so that it may rotate and be indexed axially or endwise reversed. Thus, when one side of the coupling is tapped, the chuck will be indexed 180 degrees to bring the other opening of the coupling in line with the tap. This indexing is controlled by a locking bolt X (see Fig. 5) which engages a lock bolt disk Y (Figs. 5 and 6) fastened to the end bearing of the rotating chuck to insure perfect alignment of the chuck when indexed.

To index the chuck, when the lock bolt is automatically withdrawn, a cam 22 on the end of the lock bolt lever 23 operates a valve Z which directs the oil pressure to the piston in cylinder A—B controlling a gear rack A—C in mesh with a gear 23' fastened to the end of the rotating chuck.

To enable the indexing mechanism to be operated by this gear rack, it is, of course, necessary to allow the gear rack to return freely which is accomplished by means of a roller clutch 24 located between the gear and the chuck extension (see Fig. 6). In other words, the chuck is movable in a single direction while the gear rack can move in both directions.

During the forward movement of the gear rack to index the chuck, this rack contacts means to operate a valve C which, in turn, releases the pressure on the piston W' and allows the spring A—D to force the lock bolt into a slot of the index disk Y as the slot comes into alignment with the lock bolt. This lock bolt rides on the outside of the index disk Y until its slot comes into alignment with the bolt and as soon as the lock bolt engages this slot, the cam on the lock bolt lever operates the valve Z which, in turn, reverses the oil pressure on the piston in cylinder A—B and returns the gear rack A—C to its original position.

When the lock bolt shifts into locking position, it supplies pressure to the piston in cylinder A—B, at the same time operating the valve D which controls the rapid travelling mechanism L to start the downward movement of the tap to tap the other end of the coupling.

From this point on, the machine goes through its cycles until the slide and its tap spindle return on their second upward stroke. As the slide reaches its upward position on the second cycle, the valve C again comes into play, being actuated by the valve S and the machine stops.

The valve A—E is a cushion valve controlling the speed or pressure during the last stroke of the extreme upper movement of the slide to eliminate shock to the machine or tool. Then, the cycle begins again by opening the chuck and allowing the piece to drop out.

The coupling holding chuck is hydraulically operated and controlled by means of a hand lever I' operating a chuck opening and closing valve A. As soon as the chuck opens after the work has been completely threaded at both ends and to prevent the piece dropping down through the chip pit, a damper or swinging door M swings directly underneath the chuck into position to catch the work and guide it to a conveyor 25 located in the base of the machine, by means of which it is removed from the rear of the machine.

The same pressure, controlled by the valve A, shifts a pilot operated valve B to direct pressure to a gauge stop cylinder to bring a gauge stop O into position under and to receive the coupling before it is threaded. This gauge stop is automatically drawn back into the base to clear the chuck while the coupling is being tapped.

To accomplish the proper timing of the gauge stop, the damper door and chuck, the pilot operated valve B has the proper adjusting means for the control of these three units. As soon as one tapped coupling drops out of the chuck, the pressure supplied by the pilot operated valve B brings the stop O directly below the work. This stop controls the height and proper location of the coupling in the chuck and has interchangeable top plates for various lengths of couplings. When this stop O is directly underneath the chuck a new coupling is placed in the chuck by the operator and dropped directly on top of the stop. The hand lever I' is then pushed into closing position whereupon the chuck is closed to grip the coupling. This hand lever I' controls the opening of the chuck through the piston P (see Fig. 6) and controls the closing of the chuck through the piston Q by means of a rotating plate 26 provided with cam surfaces 27 to bring the chuck jaws toward the coupling. The pressure of the pistons P and Q can be regulated by adjusting a valve in the pump 50 through the adjusting valve 28 (see Fig. 7).

In Fig. 5, the gauge stop O is shown linked to the cylinder O' and the piston in this cylinder O' causes the liquid to operate the spring pressed valve A' which, in turn, operates the stop O.

The stop O is linked to the cylinder and a stop screw B' is in position to cooperate with the heel of the link in order properly to position the stop centrally of the chuck.

This stop gauge is controlled by the valve opening and closing the chuck. The lever 1' is locked with the lever 3' so that the chuck can only be operated when the machine is stopped. After the machine is stopped the lever 1' is operated to open the chuck hydraulically and the fluid also hydraulically operates the damper or conveyor M to position it below the chuck and the work is dropped onto the conveyor.

During this time the pilot operated delay valve B which is in the line to the stop gauge, delays operation of the gauge until the conveyor M has removed the work, when the gauge is moved into position. When a new piece of work has been placed in the chuck, the lever 1' is shifted to close the chuck and the pilot operated delay valve B again delays operation of the stop gauge until the work has been chucked, whereupon the gauge is operated out of position.

When these operations have been completed, the lever 3' is released for operation to start the machine and the chuck operating lever 1' cannot be operated again until the machine has been stopped or until after the completion of the threading operation which includes the threading of one end of the work, the reversing or indexing of the chuck and the threading of the other end of the work, and upon the completion of each step in the cycle of operation, the ratchet valve is operated to direct the fluid to the next step.

Thus, it will be noted that the machine is so constructed that in order to prevent injury to the parts, the operation of the spindle and the reversing of the chuck will be effected in two cycles controlled by the ratchet valve C, at the end of which the lever 1' is released to permit the chuck to be opened and closed and the stop gauge operated before a new pair of cycles can be started.

To start the tapping operation, the operator pulls the lever 3' which is in lock with the chucking lever 1' so that this lever can operate only when the chuck is closed. As soon as the operator pulls this lever 3', the ratchet valve C is operated which also controls the pressure of the valve D to start the rapid travelling of the tap slide in its downward movement towards the work. When the tap approaches the work, the rapid traveller is automatically disengaged by the adjustable trip lever R controlled by an adjustable trip so that the lead screw will then be engaged by the nut H and the required length of thread will be cut. The tap head then contacts the trip lever R at R—A which disengages the nut H from the lead screw. As soon as the nut H is disengaged, the oil pressure operates through the cylinder S, turning the valve C to the proper position to direct the oil pressure through the valve D which, in turn, returns the slide and its tap by the rapid travelling means of cylinder L to the top position. When the piston reaches the hole T in the cylinder L, the oil is then forced through the line U to the two-way valve V. On the first cycle, the liquid passes through the valve V freely to the lock bolt cylinder W which operates the lock bolt and lockbolt lever of the chuck indexing mechanism.

This lock bolt cylinder controls the time of indexing or turning around of the coupling for the second tapping operation, that is, tapping the other end. The lock bolt cylinder withdraws the lock bolt from the indexing locking disk. As before stated, when the lock bolt is pulled, the cam 22 located on the end of the lock bolt lever operates the valve Z which, in turn, directs the oil pressure to the piston in the cylinder A—B. The gear rack A—C which is assembled as an integral part of this piston of the cylinder A—B, meshes with a spur gear 23' on an extension of the chuck and turns the entire chuck assembly over to the new tapping position, that is, turns it over 180 degrees.

Thus, a coupling is placed in the chuck and the lever 1' actuated by the operator which controls the valve A which, in turn, energizes the chuck closing cylinder Q and by means of the cam action in the chuck, closes the jaws or jaw blocks and filler blocks on to the coupling for the tapping operation. At the same time, the pilot operated valve B withdraws the gauge stop O from under the coupling and, as before explained, to accomplish the proper timing of the gauge stop, the damper and chuck operation, this pilot operated valve B is provided.

This gauge stop is automatically advanced after the coupling has dropped through the chuck and it remains in this position to receive a new coupling to be tapped and the control of this operation is through the valve A and pilot operated valve B. After the chuck is closed by the lever 1', the lever 3' is actuated which starts the cycle of the tapping operation. To insure a positive action between the lever 1' and lever 3', a positive locking means is provided whereby the lever 3' cannot be operated until the lever 1' is closed.

In the actual tapping of the coupling, if the tap does not release, there is provided a limit switch which breaks the control circuit to the main driving motor.

As before stated, after the coupling has been tapped, the tap collapses and the collar on the tap moves the trip lever upward which opens the valve F to reverse the piston movement therein. This operation directs the oil to the nut operating cylinders G which open the split nut and the same pressure shifts the valve E to a position where the valve D causes a back pressure on the rapid traverse cylinder L. The principal use of the back pressure on this cylinder L is to limit extreme downward movement of the parts so that at no time does the combined weight of the tap and lead screw mechanism jam into the work. In short, enough pressure is maintained in the bottom of the cylinder L to support the weight of the tap and the lead screw the former in its rapid traverse action so that the rapid approach of the tap will be arrested as it nears the work. After the coupling is tapped and as the tap recedes from the work, the trip lever is contacted, opening up the proper valves and the slide and tap are returned to their upward position for the next cycle. To release the tapped coupling from its chuck, the operator must actuate the lever 1' at the end of the cycle.

It will be noted from the hydraulic operating diagram, Fig. 7, that the ratchet valve C has eight distinct stations in couples of four, the initial stations, 1, 2, 3 and 4 controlling the first cycle of tapping one side of the coupling and the second set of stations controlling the second cycle of tapping. Thus, the ratchet valve controls the entire cycle of operations of the machine and through the operation of the various valves which either pass the pressure through the valves or block them by equal pressure, it is possible to direct the pressure or by-pass the pressure through the various valves to control the cycle of operations.

The first four stations of this ratchet valve C control (1) the rapid travel of the tap toward the work; (2) the engagement of the lead screw by the nut; (3) the releasing of the nut and (4) the rapid travel of the tap slide upward which releases the lock bolt and starts the indexing of the chuck. The four stations of the second cycle begin upon completion of the indexing when the lock bolt drops into place and are the same as the first cycle except that instead of indexing the chuck the machine is stopped on completion of the threading of the coupling, at which time the lever 3' is automatically operated to its original starting position and locked to prevent any further movement of the slide and its tap.

This ratchet valve C is controlled by the hydraulic cylinder S which receives pressure through the valve F and this hydraulic cylinder, by means of its piston, operates through a pawl the ratchet of the valve C.

From the foregoing, it will be seen that, by means of the hydraulically controlled movements, all of the operations of the machine or the idle time of the machine is reduced practically to a minimum; the operation of the machine is controlled by valves cut in and out automatically according to the requirements of the machine. A combination high and low pressure pump is used to supply a large quantity of oil at low pressure for machine operation and at high pressure for the proper chuck gripping and which high pressure can be regulated to any wall thickness of coupling to prevent distortion.

It will also be noted that the tap slide is properly balanced by counterweights.

All cycles and operations are interlocked. That is to say, if the chuck is not closed, the tap spindle cannot start on its downward movement. If the chuck is not indexed to its proper position, the spindle cannot be engaged for its downward movement. Should the tap not be reset properly, the machine comes to a stop through safety means so that no damage can be done.

If the downward stroke of the slide which carries the rotating spindle is not adjusted properly, a safety is provided to stop the machine completely before any damage can be done so that by means of these safeties, all movements or actions of the machine which would disturb the proper functioning of the machine are prevented.

Change gears are provided in the upper housing for controlling the speed of the lead screw for different pitches of thread and the cutting speed of the tap is controlled by a variable speed motor which, in turn, positively controls the correct speed of the lead screw and the cutting oil is automatically controlled by means of a valve so that as soon as the split nut engages the lead screw the oil is turned on. Therefore, the oil is only turned on when necessary in the cutting operations. When the chuck opens, the grip jaws open by means of a spring action, holding the grip jaws against the cam surface and should, in some cases, the coupling adhere to one jaw, means are provided between the gripping jaws to force the coupling away from the jaw and free it from the gripping contact of the jaws so that when the chuck opens, the coupling can drop freely.

In practice, the present improvement may be used as a boring machine or as a threading machine by the mere substitution of the proper cutting tools which, of course, would be obvious to one skilled in the art, and the indexing mechanism may be locked so that the machine may be used to operate on only one end of the work if desired by adjusting the valve C so as to direct the pressure to stop the machine on completion of each up-stroke of the rapid traveling cylinder L.

Having thus explained the nature of our said invention and described a way of constructing and using the same, although without attempting to set forth all of the forms in which it may be made or all of the modes of its use, we claim:

1. In a tapping machine, the combination of a reciprocating and rotatable spindle adapted to carry a tap, means comprising a lead screw for feeding the spindle during the threading of the work, means independent of the lead screw for rapidly reciprocating the spindle before and after the threading operation, an indexible chuck mechanism for holding the work, fluid operated means for indexing said chuck mechanism, and stop gauge mechanism for positioning the work in the chuck and all operative in timed relation.

2. In a tapping machine, the combination of a reciprocating and rotatable spindle adapted to carry a tap, means comprising a lead screw for feeding the spindle during the threading of the work, fluid operated means for rapidly reciprocating the spindle before and after the threading operation, an indexible chuck mechanism for holding the work, fluid operated means for indexing said chuck mechanism, and stop gauge mechanism for positioning the work in the chuck and all operative in timed relation.

3. In a tapping machine, the combination of a reciprocating and rotatable spindle adapted to carry a tap, means for feeding the spindle during the threading of the work, fluid controlled means for rapidly reciprocating the spindle before and after the threading operation, an indexible chuck mechanism for holding the work, fluid operated means for indexing said chuck mechanism, and stop gauge mechanism for positioning the work in the chuck and all operative in timed relation.

4. In a tapping machine, the combination of a reciprocating and rotatable spindle adapted to carry a tap, means comprising a lead screw for feeding the spindle during the threading of the work, means independent of the lead screw for rapidly reciprocating the spindle before and after the threading operation, an indexible chuck mechanism for holding the work, fluid operated means for indexing said chuck mechanism, and fluid operated stop gauge mechanism for positioning the work in the chuck and all operative in timed relation.

5. In a tapping machine, the combination of a reciprocating and rotatable spindle adapted to carry a tap, means comprising a lead screw for feeding the spindle during the threading of the work, fluid operated means for rapidly reciprocating the spindle before and after the threading operation, an indexible chuck mechanism for holding the work, fluid operated means for indexing said chuck mechanism, and fluid operated stop gauge mechanism for positioning the work in the chuck and all operative in timed relation.

6. In a tapping machine, the combination of a reciprocating and rotatable spindle adapted to carry a tap, means for feeding the spindle during the threading of the work, fluid controlled means for rapidly reciprocating the spindle before and after the threading operation, an indexible chuck mechanism for holding the work, fluid operated means for indexing said chuck mechanism, and fluid operated stop gauge mechanism for positioning the work in the chuck and all operative in timed relation.

7. In a tapping machine, the combination of a reciprocating and rotatable spindle adapted to carry a tap, means for feeding it during the threading operation, means for rapidly reciprocating it before and after the threading operation, an indexible work carrying chuck, means for indexing it, and a stop gauge for gauging the position of the work in the chuck and operative in timed relation with the indexing mechanism and the spindle.

8. In a tapping machine, the combination of a reciprocating and rotatable spindle adapted to carry a tap, means for feeding it during the threading operation, means for rapidly reciprocating it before and after the threading operation, an indexible work carrying chuck, means for indexing it, and a fluid controlled stop gauge for gauging the position of the work in the chuck and operative in timed relation with the indexing mechanism and the spindle.

9. In a tapping machine, the combination of a reciprocating and rotatable spindle adapted to carry a tap, means comprising a lead screw for feeding the spindle during the threading of the work, fluid controlled means for rapidly reciprocating the spindle before and after the threading operation, an indexible work holding chuck, fluid controlled means for indexing the chuck, locking means for the chuck, fluid controlled means for sadi locking means, a stop gauge for positioning the work in the chuck, fluid controlled means for operating said stop gauge, and means for controlling the operation of the spindle and chuck operating means, locking means and stop gauge in succession.

10. In a tapping machine, the combination of a reciprocating and rotatable spindle adapted to carry a tap, means comprising a lead screw for feeding the spindle during the threading of the work, fluid controlled means for rapidly reciprocating the spindle before and after the threading operation, an indexible work holding chuck, fluid controlled means for indexing the chuck, locking means for the chuck, fluid controlled means for said locking means, a stop gauge for positioning the work in the chuck, fluid controlled means for operating said stop gauge, a conveyor for receiving the work from the chuck, fluid controlled means for operating said conveyor, and means for controlling the operation of said elements in timed sequence.

11. In a tapping machine, the combination of a reciprocating and rotatable spindle adapted to carry a tap, means comprising a lead screw for feeding the spindle during the threading of the work, fluid controlled means for rapidly reciprocating the spindle before and after the threading operation, an indexible work holding chuck, fluid controlled means for indexing the chuck, locking means for the chuck, fluid controlled means for said locking means, a stop gauge for positioning the work in the chuck, fluid controlled means for operating said stop gauge, manually operative means for controlling the fluid controlled means for the stop gauge, and manually operated means for controlling the fluid operated means for the spindle, one operative only after the operation of the other.

12. In a tapping machine, the combination of a reciprocating and rotatable spindle adapted to carry a tap, means comprising a lead screw for feeding the spindle during the threading of the work, fluid controlled means for rapidly reciprocating the spindle before and after the threading operation, an indexible work holding chuck, fluid controlled means for indexing the chuck, locking means for the chuck, fluid controlled means for said locking means, a stop gauge for positioning the work in the chuck, fluid controlled means for operating said stop gauge, a conveyor for receiving the work from the chuck, fluid controlled means for operating said conveyor, manually operative means for controlling the operation of the chuck, work conveying means and stop gauge, manually operative means for controlling the operation of the spindle, and means for preventing the operation of the spindle until after the chuck is in closed position.

13. In a tapping machine, the combination of a reciprocating and rotatable spindle adapted to carry a tap, means comprising a lead screw for feeding the spindle during the threading of the work, fluid controlled means for rapidly reciprocating the spindle before and after the threading operation, an indexible work holding chuck, fluid controlled means for indexing the chuck, locking means for the chuck, fluid controlled means for said locking means, a stop gauge for positioning the work in the chuck, fluid controlled means for operating said stop gauge, a conveyor for receiving the work from the chuck, fluid controlled means for operating said conveyor, manually operative means for controlling the operation of the chuck, work conveying means and stop gauge, manually operative means for controlling the operation of the spindle, said manually operative means interlocking whereby one is inoperative prior to the operation of the other.

14. A machine having a fast and slow speed tapping spindle and a work holding axially supported chuck, fluid controlled means for indexing the chuck on its own axis 180 degrees, fluid controlled means for locking the chuck in its indexed position, and fluid controlled means for opening and closing the chuck, and operative in timed relation with the operation of the spindle.

15. A machine having a fast and slow speed tapping spindle and a work holding axially supported chuck, fluid controlled means for indexing the chuck on its own axis 180 degrees, fluid controlled means for locking the chuck in its indexed position, fluid controlled means for opening and closing the chuck, and manually operative means for controlling said fluid opening and closing means and thereafter the operation of the spindle.

16. A machine having a fast and slow speed tapping spindle and a work holding axially supported chuck, fluid controlled rack mechanism for indexing the chuck on its own axis 180 degrees, fluid controlled locking means for locking the chuck in its indexed position, and fluid controlled means for opening and closing the chuck, and operative in timed relation with the operation of the spindle.

17. In a tapping machine, the combination of a reciprocating and rotatable spindle adapted to carry a tap, means comprising a lead screw for feeding the spindle during the threading of the work, fluid controlled means for rapidly reciprocating the spindle before and after the threading operation, an indexible work holding chuck, fluid controlled means for indexing the chuck, locking means for the chuck, fluid controlled means for said locking means, a stop gauge for positioning the work in the chuck, fluid controlled means for operating said stop gauge, and a ratchet controlled valve mechanism for controlling some of said fluid controlled means and the spindle and chuck in timed relation.

18. In a tapping machine having a reciprocating and rotatable spindle adapted to carry a tap, a lead screw cooperating therewith, means for rotating the lead screw, means for connecting and disconnecting the lead screw with and from the spindle, means for rapidly reciprocating the spindle relative to the lead screw, an indexible work holding chuck, locking means therefor, chuck opening and closing means, a stop gauge for positioning the work in the chuck, valve controlled hydraulic means for actuating certain of said parts in cycles, and means for preventing the operation of the spindle during the indexing and the opening and closing movements of the chuck.

19. In a threading machine, the combination of a reciprocating and rotatable spindle adapted to carry a threading tool, means comprising a lead screw for feeding the spindle during the threading of the work, means independent of the lead screw for rapidly reciprocating the spindle before and after the threading operation, and endwise reversible chuck mechanism cooperating in timed relation with the spindle, said independent means also controlling the reversing of said chuck upon movement of the spindle in one direction at a predetermined time.

20. In a threading machine, the combination of a reciprocating and rotatable spindle adapted to carry a threading tool, means comprising a lead screw for feeding the spindle during the threading of the work, fluid operated means for rapidly reciprocating the spindle before and after the threading operation, and endwise reversible chuck mechanism cooperating in timed relation with the spindle, said fluid operated means also controlling the reversing of said chuck upon movement of the spindle in one direction at a predetermined time.

21. In a threading machine, the combination of a reciprocating and rotatable spindle adapted to carry a threading tool, means for feeding the spindle during the threading of the work, an endwise reversible chuck, and fluid controlled means for rapidly reciprocating the spindle before and after the threading operation, said fluid controlled means also operative to effect the reversing of said chuck upon movement of the spindle in one direction at a predetermined time.

22. In a threading machine, the combination of a reciprocating and rotatable spindle adapted to carry a threading tool and including a lead screw for feeding the spindle during the threading operation, means for connecting and disconnecting the lead screw, an endwise reversible chuck, and means for rapidly shifting the spindle on the disconnection of the lead screw, said means also operative to effect the reversing of said chuck upon rapid shifting of the spindle at a predetermined time.

23. In a threading machine, the combination of a reciprocating and rotatable spindle adapted to carry a threading tool and including a lead screw for feeding the spindle during the threading operation, a fluid operated mechanism for connecting and disconnecting the lead screw, an endwise reversible chuck mechanism, means for operating the chuck mechanism, and means for rapidly shifting the spindle on the disconnection of the lead screw, said last means also effective to permit operation of said chuck operating means upon rapid shifting of the spindle at a predetermined time.

24. In a threading machine, the combination of a reciprocating and rotatable spindle adapted to carry a threading tool and including a lead screw for feeding the spindle during the threading operation, a fluid operated mechanism for connecting and disconnecting the lead screw, an endwise reversible chuck mechanism, means for operating the chuck mechanism, and fluid operated means for rapidly shifting the spindle on the disconnection of the lead screw, said last means also effective to permit operation of said chuck operating means upon rapid shifting of the spindle at a predetermined time.

25. In a threading machine, the combination of a reciprocating and rotatable spindle adapted to carry a threading tool, means comprising a lead screw for feeding the spindle during the threading of the work, means independent of the lead screw for rapidly reciprocating the spindle before and after the threading operation, an endwise reversible chuck mechanism for holding the work, means for reversing it, and means cooperating with the chuck mechanism for controlling said rapid reciprocating means of the spindle at a predetermined time, and means cooperating with the spindle for effecting the reversing of said chuck upon movement of the spindle in one direction at a predetermined time.

26. In a threading machine, the combination of a reciprocating and rotatable spindle adapted to carry a threading tool, means comprising a lead screw for feeding the spindle during the threading of the work, fluid operated means for rapidly reciprocating the spindle before and after the threading operation, an endwise reversible chuck mechanism for holding the work, means for reversing it, means cooperating with the chuck mechanism for controlling said rapid reciprocating means of the spindle at a predetermined time, and means cooperating with the spindle for effecting the reversing of said chuck upon movement of the spindle in one direction at a predetermined time.

27. In a threading machine, the combination of a reciprocating and rotatable spindle adapted to carry a threading tool, means for feeding the spindle during the threading of the work, fluid controlled means for rapidly reciprocating the spindle before and after the threading operation, an endwise reversible chuck mechanism for holding the work, means for reversing it, means cooperating with the chuck mechanism for controlling said rapid reciprocating means of the spindle at a predetermined time, and means cooperating with the spindle for effecting the reversing of said chuck upon movement of the spindle in one direction at a predetermined time.

28. In a threading machine, the combination of a reciprocating and rotatable spindle adapted to carry a threading tool and including a lead screw for feeding the spindle during the threading operation, means for connecting and disconnecting the lead screw, means for rapidly shifting the spindle on the disconnection of the lead screw, an endwise reversible chuck mechanism for holding the work, means for reversing it, means cooperating with the chuck mechanism for controlling said rapid reciprocating means of the spindle at a predetermined time, and means cooperating with the spindle for effecting the reversing of said chuck upon movement of the spindle in one direction at a predetermined time.

29. In a threading machine, the combination of a reciprocating and rotatable spindle adapted to carry a threading tool and including a lead screw for feeding the spindle during the threading operation, a fluid operated mechanism for connecting and disconnecting the lead screw, means for rapidly shifting the spindle on the disconnection of the lead screw, an endwise reversible chuck mechanism for holding the work, means for reversing it, means cooperating with the chuck mechanism for controlling said rapid reciprocating means of the spindle at a predetermined time, and means cooperating with the spindle for effecting the reversing of said chuck upon movement of the spindle in one direction at a predetermined time.

30. In a threading machine, the combination of a reciprocating and rotatable spindle adapted to carry a threading tool and including a lead screw for feeding the spindle during the threading operation, a fluid operated mechanism for connecting and disconnecting the lead screw, fluid operated means for rapidly shifting the spindle on the disconnection of said lead screw, an endwise reversible chuck mechanism for holding the work, means for reversing it, means cooperating with the chuck mechanism for controlling said rapid reciprocating means of the spindle at a predetermined time, and means cooperating with the spindle for effecting the reversing of said chuck upon movement of the spindle in one direction at a predetermined time.

31. In a threading machine, the combination of a reciprocating and rotatable spindle adapted to carry a threading tool, means comprising a lead screw for feeding the spindle during the threading of the work, means independent of the lead screw for rapidly reciprocating the spindle before and after the threading operation, an endwise reversible chuck mechanism for holding the work, and fluid operated means for reversing said chuck mechanism and controlled by said independent means upon movement of the spindle in one direction at a predetermined time.

32. In a threading machine, the combination of a reciprocating and rotatable spindle adapted to carry a threading tool, means comprising a lead screw for feeding the spindle during the threading of the work, fluid operated means for rapidly reciprocating the spindle before and after the threading operation, an endwise reversible chuck mechanism for holding the work, and fluid operated means for reversing said chuck mechanism and controlled by said first fluid operated means upon movement of the spindle in one direction at a predetermined time.

33. In a threading machine, the combination of a reciprocating and rotatable spindle adapted to carry a threading tool, means for feeding the spindle during the threading of the work, fluid controlled means for rapidly reciprocating the spindle before and after the threading operation, an endwise reversible chuck mechanism for holding the work, fluid operated means for reversing said chuck mechanism and controlled by said first fluid controlled means upon movement of the spindle in one direction at a predetermined time, and means cooperating with the chuck mechanism and operative to control said rapid reciprocating means of the spindle at a predetermined time.

34. In a threading machine, the combination of a reciprocating and rotatable spindle adapted to carry a threading tool, means comprising a lead screw for feeding the spindle during the threading of the work, means independent of the lead screw for rapidly reciprocating the spindle before and after the threading operation, an endwise reversible chuck mechanism for holding the work, fluid operated means for reversing said chuck mechanism, locking mechanism for the reversible chuck mechanism, and means controlled by said independent means of the spindle for operating it in one direction, said locking mechanism operative in the other direction to control said independent means of the spindle.

35. In a threading machine, the combination of a reciprocating and rotatable spindle adapted to carry a threading tool, means comprising a lead screw for feeding the spindle during the threading of the work, fluid operated means for rapidly reciprocating the spindle before and after the threading operation, an endwise reversible chuck mechanism for holding the work, fluid operated means for reversing said chuck mechanism, locking mechanism for the reversible chuck mechanism, and means controlled by said first fluid operated means for operating it in one direction, said locking mechanism operative in the other direction to control said first fluid operated means.

36. In a threading machine, the combination of a reciprocating and rotatable spindle adapted to carry a threading tool, means for feeding the spindle during the threading of the work, fluid operated means for rapidly reciprocating the spindle before and after the threading operation, an endwise reversible chuck mechanism for holding the work, fluid operated means for reversing said chuck mechanism, locking mechanism for the reversible chuck mechanism, and means controlled by said first fluid operated means for operating it in one direction, said locking mechanism operative in the other direction to control said first fluid operated means.

37. In a threading machine, the combination of a reciprocating and rotatable spindle adapted to carry a threading tool, means comprising a lead screw for feeding the spindle during the threading of the work, means independent of the lead screw for rapidly reciprocating the spindle before and after the threading operation, an endwise reversible chuck mechanism for holding the work, fluid operated means for reversing said chuck mechanism, locking mechanism for the reversible chuck mechanism, and fluid operated means controlled by said independent means of the spindle for operating it in one direction, said locking mechanism operative in the other direction to control said independent means of the spindle.

38. In a threading machine, the combination of a reciprocating and rotatable spindle adapted to carry a threading tool, means comprising a lead screw for feeding the spindle during the threading of the work, fluid operated means for rapidly reciprocating the spindle before and after the threading operation, an endwise reversible chuck mechanism for holding the work, fluid operated means for reversing said chuck mechanism, locking mechanism for the reversible chuck mechanism, and fluid operated means controlled by said first fluid operated means for operating it in one direction, said locking mechanism operative in the other direction to control said first fluid operated means.

39. In a threading machine, the combination of a reciprocating and rotatable spindle adapted to carry a threading tool, means for feeding the spindle during the threading of the work, fluid operated means for rapidly reciprocating the spindle before and after the threading operation, an endwise reversible chuck mechanism for holding the work, fluid operated means for reversing said chuck mechanism, locking mechanism for the reversible chuck mechanism, and fluid operated means controlled by said first fluid operated means for operating it in one direction, said locking mechanism operative in the other direction to control said first fluid operated means.

40. In a threading machine, the combination of a reciprocating and rotatable spindle adapted to carry a threading tool, means for feeding it during the threading operation, means for rapidly reciprocating it before and after the threading operation, an endwise reversible work carrying chuck, means controlled by said rapidly reciprocating means for reversing it, and means cooperating with said chuck for controlling the operation of said rapidly reciprocating means upon reversal of said chuck.

41. In a threading machine, the combination of a reciprocating and rotatable spindle adapted to carry a threading tool, means for feeding it during the threading operation, means for rapidly reciprocating it before and after the threading operation, an endwise reversible work carrying chuck, fluid operated means controlled by said rapidly reciprocating means for reversing it, and means cooperating with said chuck for controlling the operation of said rapidly reciprocating means upon reversal of said chuck.

42. In a threading machine, the combination of a reciprocating and rotatable spindle adapted to carry a threading tool, means for feeding it during the threading operation, means for rapidly reciprocating it before and after the threading operation, an endwise reversible work carrying chuck, means controlled by said rapidly reciprocating means for reversing it, and locking means for locking the chuck and also controlled by said rapidly reciprocating means for movement in one direction and operative in the other direction to control said rapidly reciprocating means.

43. In a threading machine, the combination of a reciprocating and rotatable spindle adapted to carry a threading tool, means for feeding it during the threading operation, means for rapidly reciprocating it before and after the threading operation, an endwise reversible work carrying chuck, means controlled by said rapidly reciprocating means for reversing it, and fluid controlled locking means for locking the chuck and also controlled by said rapidly reciprocating means for movement in one direction and operative in the other direction to control said rapidly reciprocating means.

44. In a threading machine, the combination of a reciprocating and rotatable spindle adapted to carry a threading tool, means for feeding it during the threading operation, means for rapidly reciprocating it before and after the threading operation, an endwise reversible work carrying chuck, means controlled by said rapidly reciprocating means for reversing it, means cooperating with said chuck for controlling the operation of said rapidly reciprocating means upon reversal of said chuck, and a conveyor operative by release of the chuck for receiving the work from the chuck.

45. In a threading machine, the combination of a reciprocating and rotatable spindle adapted to carry a threading tool, means for feeding it during the threading operation, means for rapidly reciprocating it before and after the threading operation, an endwise reversible work carrying chuck, means controlled by said rapidly reciprocating means for reversing it, means cooperating with said chuck for controlling the operation of said rapidly reciprocating means upon reversal of said chuck, and a fluid controlled conveyor operative by release of the chuck for receiving the work from the chuck.

46. A machine having a fast and slow feed spindle and a work holding axially supported chuck, means for reversing the chuck end for end and on its own axis, locking means for the chuck, the fast movement of the spindle in one direction at a predetermined time controlling the release and reversal of said chuck, and means controlled by the locking means for controlling said spindle.

47. A machine having a fast and slow feed spindle and a work holding axially supported chuck, fluid controlled means for endwise reversing the chuck on its own axis, fluid controlled locking means for the chuck, the fast movement of the spindle in one direction at a predetermined time controlling the release and reversal of said chuck, and means controlled by the locking means for controlling said spindle.

48. In a tapping machine, the combination of a reciprocating and rotatable spindle adapted to carry a tap, means for feeding it during the threading operation, means for rapidly reciprocating it before and after the threading operation, an endwise reversible work carrying chuck, means for reversing it, and locking means for the chuck operative in one direction by the rapidly reciprocating means at a predetermined time and operative in the other direction to control the rapid reciprocating means of the spindle.

49. In a tapping machine having a reciprocating and rotatable spindle adapted to carry a tap, a lead screw cooperating therewith, means for rotating the lead screw, means for connecting and disconnecting the lead screw with and from the spindle, means for rapidly reciprocating the spindle relative to the lead screw, an endwise reversible work holding chuck, locking means therefor, chuck opening and closing means, a stop gauge for positioning the work in the chuck, and a hydraulically controlled valve means for actuating certain of said parts including the reciprocation of the spindle and its connection with and disconnection from the lead screw in cycles, certain of said parts including the reversing of the chuck between cycles.

50. In a tapping machine having a reciprocating and rotatable spindle adapted to carry a tap, a lead screw cooperating therewith, means for rotating the lead screw, means for connecting and disconnecting the lead screw with and from the spindle, means for rapidly reciprocating the spindle relative to the lead screw, an endwise reversible work holding chuck, locking means therefor, chuck opening and closing means, a stop gauge for positioning the work in the chuck, and a hydraulically controlled ratchet valve means for actuating certain of said parts, including the reciprocation of the spindle and its connection with and disconnection from the lead screw in cycles, four steps to a cycle, and certain of said parts including the reversing of the chuck between cycles.

51. A machine having a fast and slow feed spindle and a work holding axially supported chuck, fluid controlled means for indexing the chuck on its own axis 180 degrees, fluid controlled means for locking the chuck in its indexed position, fluid controlled means for opening and closing the chuck, manually operative means for controlling said fluid opening and closing means, and manually operative means for controlling the spindle, both of said manually operative means operable in sequence and interlocked to prevent operation of one during the operation of the other.

ALFRED E. DRISSNER.
WILLIAM J. HOGG.
KENNETH W. BARKINEN.
CHARLES Q. GAREY.